United States Patent [19]

Reba

[11] Patent Number: 4,462,722

[45] Date of Patent: * Jul. 31, 1984

[54] TRIM SEPARATOR

[75] Inventor: Imants Reba, Vancouver, Wash.

[73] Assignee: Crown Zellerbach Corporation, San Francisco, Calif.

[*] Notice: The portion of the term of this patent subsequent to Dec. 27, 2000 has been disclaimed.

[21] Appl. No.: 444,146

[22] Filed: Nov. 24, 1982

Related U.S. Application Data

[63] Continuation of Ser. No. 328,355, Dec. 7, 1981, Pat. No. 4,422,565.

[51] Int. Cl.$^3$ ............................................. B65G 53/60
[52] U.S. Cl. ...................................... 406/154; 55/319; 55/392; 55/418; 406/157; 406/195
[58] Field of Search ............... 406/154, 157, 164, 195; 226/97; 55/319, 320, 392, 418, 461

[56] References Cited

U.S. PATENT DOCUMENTS

| | | | |
|---|---|---|---|
| 1,340,606 | 5/1920 | Groenewold | 406/154 X |
| 1,518,223 | 12/1924 | Schott et al. | 406/154 X |
| 3,766,719 | 10/1973 | McAnally | 55/457 X |
| 4,422,565 | 12/1983 | Reba | 226/97 |

Primary Examiner—Jeffrey V. Nase
Attorney, Agent, or Firm—Thomas R. Lampe

[57] ABSTRACT

Apparatus for removing trim from a conveying fluid medium including a conduit defining a generally rectangular shaped exit opening. A fluid flow attachment plate leads from the opening for redirecting movement of the fluid medium. A screen for interrupting movement of the trim and separating it from the fluid medium is attached to the fluid flow attachment plate.

8 Claims, 3 Drawing Figures

TRIM SEPARATOR

This application is a continuation in part of co-pending U.S. patent application Ser. No. 06/328,355, filed Dec. 7, 1981, now U.S. Pat. No. 4,422,565, for Strip Material Transporting Apparatus by Imants Reba.

BACKGROUND OF INVENTION

The apparatus of the present invention is employed to separate trim from moving air or other fluid medium used to transport the trim.

A common by-product in web converting operations is the formation of trim which may be in either a continuous or chopped form. Trim is commonly created, for example, during converting operations pertaining to paper and nonwoven webs and plastic films. Often such trim is created at a very high rate so it becomes imperative to efficiently and quickly remove the trim from the location of its formation. A common expedient for doing this has been to employ air flows for receiving the trim and conveying to an appropriate location away from the converting operation. It will be appreciated that such an approach creates the problem at the downstream end of separating the trim from the conveying medium. This problem is presented regardless of whether the trim is continuous or chopped.

While a number of separators are commercially available, such prior art units suffer from a variety of drawbacks not the least of which is the fact that they are large and bulky, requiring sturdy supports and large headroom. Also, such units are often expensive to construct and operate, especially those existing separators which require supplemental fans to assist in carrying out the separating operation.

BRIEF SUMMARY OF THE INVENTION

In contrast to the existing commercially available prior art arrangements the apparatus of the present invention is compact, lightweight and relatively inexpensive in construction. The separator apparatus of this invention is therefore readily capable of attachment to existing trim conveying ducts. Further, the present apparatus provides highly efficient separation without employing any supplemental exhaust fan. The conveying air itself is utilized to perform the separating function when the apparatus of this invention is employed, thus resulting in essentially zero operating expenses.

The present apparatus including a conduit means to be placed at the discharge end of a duct conveying trim in moving air or other fluid medium. The conduit means walls form a generally rectangular shaped exit opening through which the trim and fluid medium exit, the exit opening having a predetermined thickness defined by the walls. Fluid flow attachments means having a generally curved fluid flow attachment surface leads from the conduit means adjacent to the exit opening to a predetermined location spaced therefrom. The surface has a radius of curvature at least five times greater in magnitude than the thickness defined by the walls. The conveying fluid medium becomes attached to the curved fluid flow attachment surface due to the Coanda effect and a screen disposed adjacent to the fluid flow attachment surface interrupts movement of the trim being conveyed by the fluid medium as the flow along the fluid flow attachment surface takes place. The trim is thus separated from the moving fluid medium.

DETAILED DESCRIPTION

Figure 1:
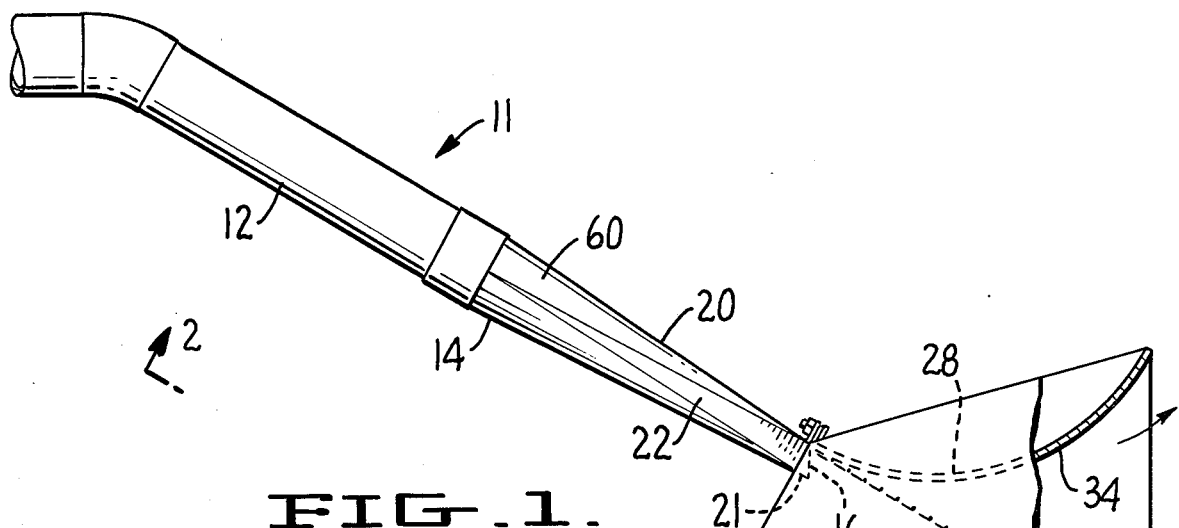
FIG. 1 is a side view of a preferred form of apparatus constructed in accordance with the teachings of the present invention attached to the end of a conveying duct.
Figure 2:
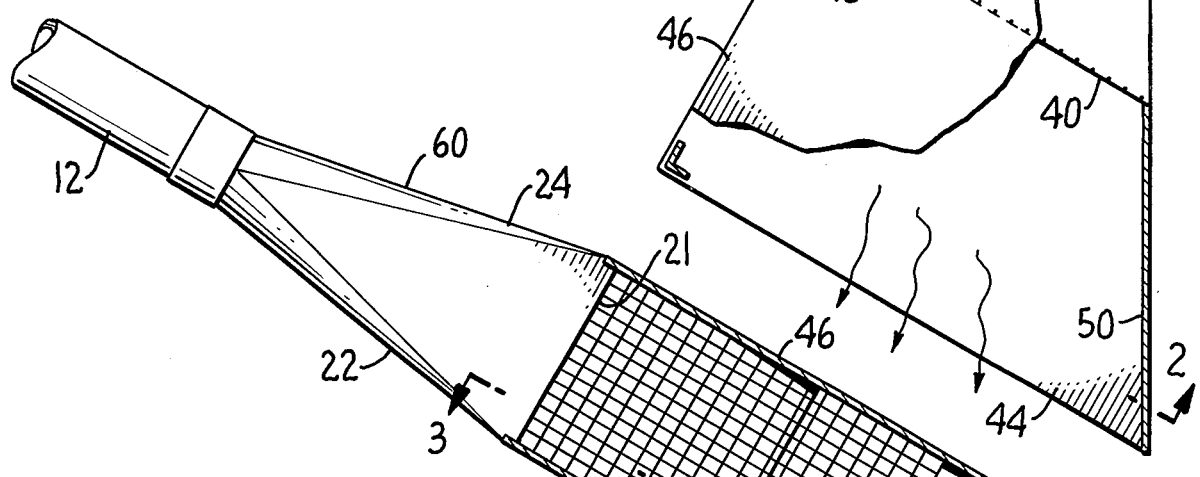
FIG. 2 is a bottom view of the apparatus.
Figure 3:
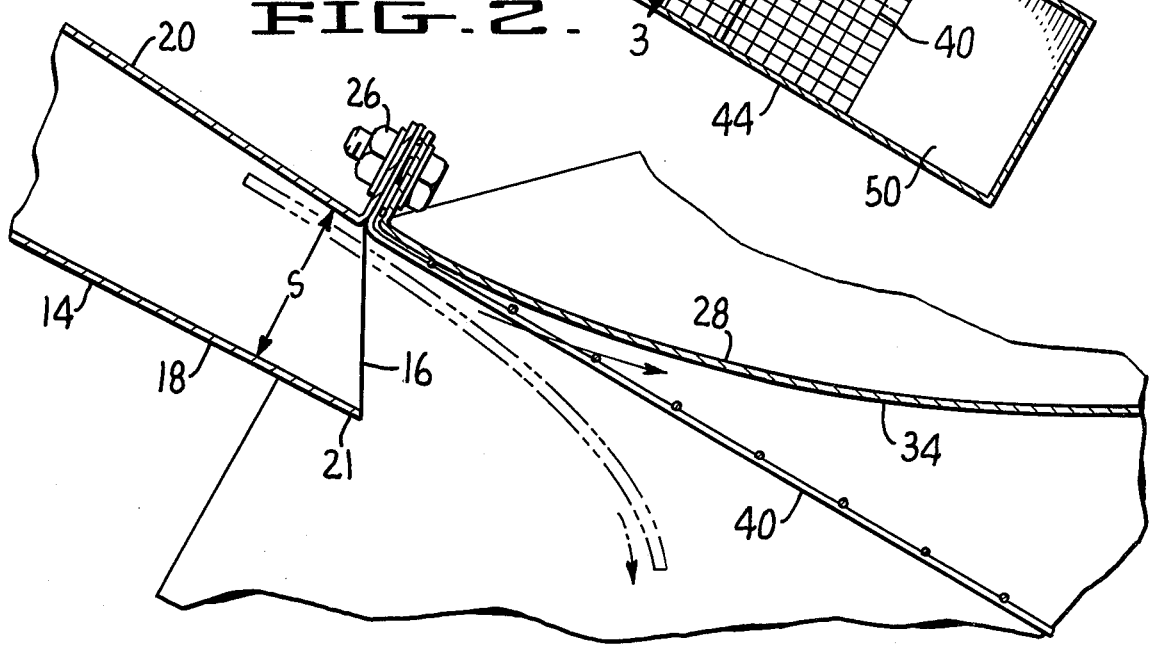
FIG. 3 is an enlarged cross sectional view taken along the line 3—3 in FIG 2.

Referring now to the drawings, a preferred form of apparatus constructed in accordance with the teachings of the present invention is illustrated. The apparatus, generally indicated by reference numeral 11, is adapted to be connected in any suitable manner to the outlet of duct 12 which is used to convey trim in a moving fluid medium within the interior thereof. It is the function of apparatus 11 to separate such trim from the moving fluid medium which is most commonly an air flow moving from the source of the trim to the exit of duct 12. Apparatus 11 performs such separating function for both chopped and continuous trim and requires no auxiliary air flow generating means to provide such separation.

Apparatus 11 includes a conduit 14 which has a cross section at the end thereof adjacent to the duct corresponding to that of the duct. In the illustrated embodiment, for example, such cross sectional configuration is generally circular. At the end thereof remote from the duct, conduit 14 defines a generally rectangularly shaped exit opening 16 through which the trim and its conveying fluid medium exit in a predetermined direction. The exit opening 16 is defined by elongated walls 18 and 20 and interconnected sidewalls 22 and 24. Elongated walls 18 and 20 are separated a predetermined thickness S. One of the elongated walls, in the present embodiment elongated wall 18, extends a distance somewhat greater than elongated wall 20 to provide an extension 21.

Attached to conduit 14 as by means of threaded connector 26 is a fluid flow attachment means in the form of a curved plate 28. Plate 28 defines a generally curved fluid flow attachment surface 34 leading from conduit 14 adjacent to opening 16 to a predetermined location spaced from the opening and offset from the predetermined direction of motion of the trim and conveying medium exiting from conduit 14. In the arrangement illustrated, such predetermined direction is established by and in alignment with the parallel elongated walls 18 and 20 at the exit opening. The air or other entraining fluid medium will attach to the fluid flow attachment surface 34 due to the Coanda effect and proceed along said surface.

If means were not provided to interrupt passage of the trim being conveyed, such trim would of course follow the path established by the fluid flow attachment surface along with the conveying fluid medium. The present apparatus provides means for interrupting trim movement in the form of a screen 40 extending from elongated wall 20 generally along said predetermined direction as established by said walls 18 and 20. In the illustrated embodiment screen 40 is a wire mesh screen; however, any suitable screen may be utilized provided that it defines sufficient open area for air to flow therethrough and follow fluid flow attachment surface 34. Through empirical investigation it has been found, for example, that the apertures defined by a fine wire mesh screen are adequate if they have a minimum cross sectional dimension in the order of ¼ inch. After the trim movement is interrupted by the screen it will fall in a downwardly direction under the influence of gravity. The radius of curvature of fluid flow attachment surface 34 must be sufficiently large to ensure stable flow attachment, even in the presence of the screen and trim. The smaller the radius of curvature, the more suction will be generated creating stopping forces on the trim. If such forces were sufficiently large, trim would tend to collect on the screen and not fall down. On the other hand, too large a radius of curvature would increase the bulk of the system without any compensating benefits. Experiments with constant radius Coanda type flow attachment surfaces have demonstrated that stable flow attachments require that the radius of curvature R of the fluid flow attachment surface be at least five times greater than the thickness S of opening 16, i.e. $R/S \geq 5$, and preferably at least 10 times greater, i.e. $R/S \geq 10$. It has been found that extension 21 improves flow attachment to the fluid flow attachment surface, particularly at small R/S values.

It is preferred that apparatus 11 include two substantially parallel side plates 44 and 46 extending from the conduit 14 in substantial registry with the conduit sidewalls, said plate 28 and screen 40 extending between the side plates. The side plates are desirable since they improve flow attachment of the entraining fluid medium to the fluid flow attachment surface, particularly if exit flow at the exit does not have a uniform velocity profile. Such plates also help to contain the trim as it falls downwardly from screen 40. The shape of the plates is purely arbitrary. It is also desirable to have third plate 50 extending between the side plates 44 and 46 at a location spaced from conduit exit opening 16. Third plate 50 tends to stop any trim which has sufficient inertia to reach it.

Experimentation has shown that the conduit 14 should have approximately the same cross sectional area at both ends thereof, regardless of the shape of said ends. For example, in the illustrated embodiment, the conduit entry end is circular in cross section while the exit end thereof is rectangular. Maintaining such uniformity assists in establishing a uniform uninterrupted flow of air in the conduit. Conduit 14 includes a suitable transition piece 60 constructed of any suitable material such as sheet metal to maintain a substantially uniform cross section along the length of the conduit.

One of the principal advantages of the present apparatus is that it may be utilized in connection with a duct of any cross section and placement. For example, the apparatus illustrated in the drawing is connected to a duct inclined approximately 30° with the horizontal. This is completely arbitrary since performance of the apparatus is unaffected by the angle of inclination. For example, the apparatus could be used equally efficiently with either vertical or horizontal discharge ducts. In the event the apparatus is attached to a vertical duct, the angle which the third plate 50 makes with the vertical should be made smaller, e.g. 30° or less, so that accumulation of trim pieces is prevented. If desired, gates (not shown) may be employed at the bottom of plates 44 and 46 to temporarily accumulate trim, as may be required when a trim collector such as a trim cart disposed under the apparatus is being replaced.

I claim:

1. Apparatus adapted for use in conjunction with a duct for conveying trim in a moving fluid medium and for separating said trim from said fluid medium, said apparatus comprising, in combination:

conduit means having two spaced elongated walls and two interconnected sidewalls forming a generally rectangular-shaped exit opening through which said trim and fluid medium exit in a predetermined direction, said opening having a predetermined thickness defined by said elongated walls;

fluid flow attachment means having a generally curved fluid flow attachment surface leading from said conduit means adjacent to said exit opening to a predetermined location spaced from said exit opening and offset from said predetermined direction, said surface having a radius of curvature at least five times greater in magnitude than said thickness; and a screen disposed adjacent to said fluid flow attachment surface for interrupting movement of said trim when said fluid medium becomes attached to and flows along said fluid flow attachment surface toward said predetermined location due to the Coanda effect.

2. The apparatus of claim 1 additionally comprising two substantially parallel side plates extending from said conduit in substantial registry with said conduit side walls, said fluid flow attachment means and said screen extending between said side plates.

3. The apparatus of claim 2 additionally comprising a third plate extending between said side plates at a location spaced from said conduit exit opening, said third plate being adapted to interrupt movement of trim having sufficient inertia to reach said third plate.

4. The apparatus of claim 3 wherein said plates define a downwardly directed opening of sufficient size to permit the free and unobstructed passage of trim therethrough under the influence of gravity.

5. The apparatus of claim 1 wherein said duct has a non-rectangular cross-sectional configuration and wherein said apparatus conduit means has a cross-sectional configuration at the end thereof opposite said exit opening corresponding to said duct cross-sectional configuration.

6. The apparatus of claim 5 wherein the cross-sectional areas of said duct and said conduit exit opening are substantially equal.

7. The apparatus of claim 1 wherein said surface has a radius of curvature at least ten times greater in magnitude than said thickness.

8. The apparatus of claim 1 wherein one of said elongated walls has an extension formed thereon extending in said predetermined direction.

* * * * *